(12) United States Patent
Barbas et al.

(10) Patent No.: US 11,163,904 B2
(45) Date of Patent: Nov. 2, 2021

(54) FINE-GRAINED ACCESS CONTROL TO DATASETS

(71) Applicant: INTERNATIONAL BUSINESS MACHINES CORPORATION, Armonk, NY (US)

(72) Inventors: Pedro M. Barbas, Dunboyne (IE); David Kelly, Robertstown (IE); Martin J. Neary, Swords (IE); Johnson Uman, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 295 days.

(21) Appl. No.: 16/120,489

(22) Filed: Sep. 4, 2018

(65) Prior Publication Data
US 2020/0074107 A1 Mar. 5, 2020

(51) Int. Cl.
*G06F 21/62* (2013.01)
*G06F 16/242* (2019.01)
*G06F 16/2455* (2019.01)

(52) U.S. Cl.
CPC ...... *G06F 21/6227* (2013.01); *G06F 16/2423* (2019.01); *G06F 16/24564* (2019.01)

(58) Field of Classification Search
CPC .......................... G06F 21/6227; G06F 21/2423
See application file for complete search history.

(56) References Cited

U.S. PATENT DOCUMENTS

| 6,065,012 A | 5/2000 | Balsara et al. |
| 6,253,203 B1 | 6/2001 | O'Flaherty et al. |
| 6,487,552 B1 * | 11/2002 | Lei ...................... G06F 21/6227 |
| 6,496,832 B2 | 12/2002 | Chi et al. |
| 7,243,097 B1 | 7/2007 | Agrawal et al. |
| 7,873,660 B1 * | 1/2011 | Wong .................. G06F 21/6245 |
| | | 707/781 |
| 9,015,167 B1 * | 4/2015 | Ballou ................ G06F 16/2228 |
| | | 707/741 |
| 2004/0215626 A1 | 10/2004 | Colossi et al. |

(Continued)

OTHER PUBLICATIONS

Stonebraker et al., "Access Control in a Relational Data Base Management System by Query Modification," ACM/CSC-ER, 1974, XP-002319462, pp. 180-186. (Year: 1974).*

(Continued)

*Primary Examiner* — William S Powers
(74) *Attorney, Agent, or Firm* — Alexis N. Hatzis

(57) ABSTRACT

A method, system and computer program for implementing fine-grained access control (FGAC) of data stored in a dataset. In response to receiving a data query statement from a user, any representational index exclusions that are relevant to the data query statement are identified, wherein each index exclusion specifies an access restriction to the data. It is then determined whether any of the identified representational index exclusions are to be applied to the data query statement, and if 'yes' then the data query statement is modified before being processed, so that processing of the query takes place by searching the dataset under restriction of the representational index exclusions. The proposed approach allows for easy creation and modification of FGAC privacy rules without introducing performance gaps in processing the data query statements.

20 Claims, 14 Drawing Sheets

```
CREATE EXCLUSION INDEX exclusion-index-name
ON TABLE table-name
INCLUDE COLUMNS columns-name/ALL
WHERE exclusion-condition
FOR RECIPIENT recipient-exception-authorization-name
EXCEPT RECIPIENT recipient-authorization-name
ENABLE;
```

(56) References Cited

U.S. PATENT DOCUMENTS

| | | |
|---|---|---|
| 2007/0136291 A1* | 6/2007 | Bird .................... G06F 21/6227 |
| 2011/0208780 A1 | 8/2011 | Bird |
| 2015/0339306 A1 | 11/2015 | Buschman et al. |
| 2017/0024572 A1 | 1/2017 | Ferraiolo et al. |
| 2017/0039282 A1 | 2/2017 | Krishnaprasad et al. |
| 2018/0060603 A1 | 3/2018 | Ahmed et al. |

OTHER PUBLICATIONS

Mell et al., "The NIST Definition of Cloud Computing", Recommendations of the National Institute of Standards and Technology, NIST Special Publication 800-145, Sep. 2011, 7 pages.

Graefe, "Query Evaluation Techniques for Large Databases", ACM Computing Surveys,vol. 25, No. 2, Jun. 1993, 98 pages.

Agrawal et al., "Hippocratic Databases", in Proceedings of the 28th VLDB Conference, Hong Kong, China, 2002, 12 pages.

Lefevre et al., "Limiting Disclosure in Hippocratic Databases" in Proceedings of the 30th VLDB Conference, Toronto Canada, 2004, pp. 108-119.

* cited by examiner

```
CREATE EXCLUSION INDEX exclusion-index-name
ON TABLE table-name
INCLUDE COLUMNS columns-name/ALL
WHERE exclusion-condition
FOR RECIPIENT recipient-exception-authorization-name
EXCEPT RECIPIENT recipient-authorization-name
ENABLE;
```

FIG. 2

| CONTRACT_ID | CUSTOMER_NAME | TEMPLATE_CODE | IS_ACTIVE | DATES | BUSINESS_AREA |
| --- | --- | --- | --- | --- | --- |
| 1 | BOB | 03/71 | YES | 01/2020 | MARKETING |
| 2 | BOB | 03/71 | YES | 01/2019 | SALES |
| 3 | BOB | 05/72 | NO | 01/2019 | SALES |
| 4 | BOB | 05/72 | NO | 01/2020 | FINANCE |
| 5 | ALICE | 06/79 | NO | 01/2019 | FINANCE |
| 6 | ALICE | 06/79 | NO | 01/2019 | SALES |
| 7 | ALICE | 03/71 | YES | 03/2020 | MARKETING |
| 8 | ALICE | 03/71 | YES | 03/2020 | FINANCE |

FIG. 3

| ROW_NUMBER | COLUMN_1 | COLUMN_2 | COLUMN_3 | COLUMN_4 | COLUMN_5 |
| --- | --- | --- | --- | --- | --- |
| 1 | (1,2,3,4) | (1,2,7,8) | (1,2,7,8) | (1,4) | (1,7) |
| 2 | (1,2,3,4) | (1,2,7,8) | (1,2,7,8) | (2,3,5,6) | (2,3,6) |
| 3 | (1,2,3,4) | (3,4) | (3,4,5,6) | (1,4) | (2,3,6) |
| 4 | (1,2,3,4) | (3,4) | (3,4,5,6) | (1,4) | (4,5,8) |
| 5 | (5,6,7,8) | (5,6) | (3,4,5,6) | (2,3,5,6) | (4,5,8) |
| 6 | (5,6,7,8) | (5,6) | (3,4,5,6) | (2,3,5,6) | (2,3,6) |
| 7 | (5,6,7,8) | (1,2,7,8) | (1,2,7,8) | (8) | (1,7) |
| 8 | (5,6,7,8) | (1,2,7,8) | (1,2,7,8) | (8) | (4,5,8) |

FIG. 4

```
CREATE EXCLUSION INDEX EXCLUSION-ON-CONTRACTS
ON TABLE INSURANCE.CONTRACTS
INCLUDE COLUMNS ALL
WHERE (IS_ACTIVE='Y' AND DATES='01/2020' AND DATES='01/2019')
FOR RECIPIENT ALICE
EXCEPT RECIPIENT BOB
ENABLE;
```

FIG. 5

```
| ROW_NUMBER | COLUMN_1  | COLUMN_2 | COLUMN_3    | COLUMN_4 | COLUMN_5 |
| 1          | (1,2,7,8) | (1,4)    |             |          |          |
| 2          | (1,2,7,8) | (2,3,5,6)|             |          |          |
```

FIG. 6

| CONTRACT_ID | CUSTOMER_NAME | TEMPLATE_CODE | IS_ACTIVE | DATES | BUSINESS_AREA |
| --- | --- | --- | --- | --- | --- |
| 1 | BOB | 03/71 | YES | 01/2020 | MARKETING |
| 2 | BOB | 03/71 | YES | 01/2019 | SALES |
| 3 | BOB | 05/72 | NO | 01/2019 | SALES |
| 4 | BOB | 05/72 | NO | 01/2020 | FINANCE |
| 5 | ALICE | 06/79 | NO | 01/2019 | FINANCE |
| 6 | ALICE | 06/79 | NO | 01/2019 | SALES |
| 7 | ALICE | 03/71 | YES | 03/2020 | MARKETING |
| 8 | ALICE | 03/71 | YES | 03/2020 | FINANCE |

EXCEPT (COLUMNS ALL)

| ROW_NUMBER | COLUMN_1 | COLUMN_2 | COLUMN_3 | COLUMN_4 | COLUMN_5 |
| --- | --- | --- | --- | --- | --- |
| 1 | | | (1,2,7,8) | (1,4) | |
| 2 | | | (1,2,7,8) | (2,3,5,6) | |

FIG. 7

| CONTRACT_ID | CUSTOMER_NAME | TEMPLATE_CODE | IS_ACTIVE | DATES | BUSINESS_AREA |
|---|---|---|---|---|---|
| 3 | BOB | 05/72 | NO | 01/2019 | SALES |
| 4 | BOB | 05/72 | NO | 01/2020 | FINANCE |
| 5 | ALICE | 06/79 | NO | 01/2019 | FINANCE |
| 6 | ALICE | 06/79 | NO | 01/2019 | SALES |
| 7 | ALICE | 03/71 | YES | 03/2020 | MARKETING |
| 8 | ALICE | 03/71 | YES | 03/2020 | FINANCE |

FIG. 8

FINE-GRAINED ACCESS CONTROL TO DATASETS

BACKGROUND

The present disclosure relates to fine-grained access control (FGAC) to data held in datasets such as a database of tables or a library of documents.

The pervasive use of computing technology and the increased reliance on information systems have created a heightened awareness and concern about the storage and use of private information. This worldwide phenomenon has ushered in a plethora of privacy-related guidelines and legislation, e.g. the European Union GDPR (General Data Protection Regulation), the Cybersecurity Law in China, the Canadian Privacy Act, the Australian Privacy Amendment Act, the Japanese Privacy Code, the US Health Insurance Portability and Accountability Act (HIPAA), and the US Gramm-Leach-Bliley Act (GLBA). Compliance with these various legislative provisions has become an important corporate concern. The current methods employed to address disclosure compliance involve training individuals to be cognizant of the various regulations and changing organizational processes and procedures. However, these approaches are only a partial solution and need to be augmented with technological support.

Relational Database Management Systems (RDBMSs) are of key importance for many business enterprises. Due to both compliance with privacy laws and business reasons, business enterprises are becoming increasingly sensitive to data security.

Many RDBMSs implement Discretionary Access Control (DAC) whereby privileges granted to a user control whether or not access to the data contained in a table object is allowed. These privileges may be managed by role-based access controls (RBAC), where a user wishing to access data in a table object must be a member of a role permitted to access the data in the table object.

Another technique for controlling access to data in a table is label-based access control (LBAC). Access to the data is provided at a column-level or a row-level. Unless the user has a label which is compatible with a label associated with a row or column of the table, then the data in that row or column is not returned to the user. Due to the restrictive nature of label components, business enterprises have turned to more flexible mechanisms, such as fine-grained access control (FGAC) mechanisms which include views, triggers, Oracle International Corporation's virtual private database and International Business Machines Corporation's DB2 row-and-column access control.

The following prior publications relate to FGAC for datasets in database systems.

U.S. Pat. No. 6,065,012 assigned to Microsoft Corporation relates to HTML pages, where an HTML page is made up of a table of rows and columns, whose intersections are called cells. The data source control is asked to provide the rows and columns that need to be populated. A dynamic summary view is generated by a defined HTML page that links data binding HTML tables and other HTML controls to predetermined data within a storage of data. Accessing the subset of the program module is done at the cell level by executing a script to call defined methods of the objects within the program module or accessing a control module defined within the program module.

U.S. Pat. No. 6,253,203 B1 assigned to NCR Corporation uses a large number of statically defined views to handle restrictions.

U.S. Pat. No. 6,496,832 B2 assigned to the University of Minnesota discloses a system for analyzing data organized into datasets and for transforming datasets into a visual representation. The visual representation appears to provide a dynamic view of cell structure and transformed datasets with the value of linked cells.

U.S. Patent Application Publication No. 2004/0215626 A1 assigned to International Business Machines Corporation discloses a method and system for improving performance of database queries within an RDBMS system with metadata objects. The view of the data in support of one or more summary tables is automatically identified and adjusted.

U.S. Patent Application Publication No. 2011/0208780 A1 assigned to International Business Machines Corporation discloses a method for implementing FGAC in an RDBMS system using access restrictions. Upon a user request to the database system, a determination is made as to whether any applicable access restrictions are to be enforced for the user request. Access to the relational database objects is then given within the constraint of applying the determined enforceable access restrictions.

U.S. Patent Application Publication No. 2018/060603 A1 assigned to Oracle International Corporation discloses a method of enforcing FGAC by rewriting SQL query statements based on SQL view definitions.

U.S. Patent Application Publication No. 2015/339306 A1 assigned to International Business Machines Corporation discloses a technique for accessing and manipulating data in a database based on a rule 'engine,' i.e. a policy made up of rules manages the access to data in a database. The rules are associated with hyperlinks. This technique can be used to enforce FGACs in a database.

U.S. Patent Application Publication No. 2017/024572 A1 assigned to the USA, as represented by the Secretary of Commerce National Institute of Standards and Technology, discloses a technique of enforcing FGAC in a database which is based on a next generation access control (NGAC) engine. A NGAC engine receives a translated SQL statement into is own 'language' and determines an authorization response by analysing access control data, where a permitted SQL statement is produced in response to the content of the initial SQL statement. This technique implements a policy engine to validate access control data.

U.S. Patent Application Publication No. 2017/039282 A1 assigned to Oracle International Corporation discloses a method for enforcing FGAC based on a rule engine implemented with PL/SQL language.

U.S. Pat. No. 7,243,097 B1 assigned to International Business Machines Corporation discloses a method and system for implementing FGAC in a database system as a combination of access control and privacy policy restrictions.

The article entitled, "Query Evaluation Techniques for Large Databases" by Graefe in ACM Computing Surveys, volume 25, number 2, June 1993, discloses enforcement of access control within a relational database environment.

The article entitled "Hippocratic Databases" by Agrawal, Kiernan, et al., in Proceedings of the 28th VLDB Conference, Hong Kong, China, 2002, discusses a vision of database systems that take responsibility for the privacy of data they manage, inspired by the Hippocratic oath. The article also enunciates the key privacy principles that Hippocratic databases should support.

The article entitled "Limiting Disclosure in Hippocratic Databases" by LeFevre, et al., in Proceedings of the 30th VLDB Conference, Toronto, Canada, 2004, discusses the incorporation of privacy policy enforcement into an existing application and database environment. Privacy policies (prescribed rule and conditions) are stored in the database where they can be used to enforce limited disclosure. Every query is associated with purpose and recipient pairs. SQL queries issued to the database are intercepted and augmented to reflect the privacy policy rules regarding the purpose and recipient issuing the query.

However, generally, existing FGAC solutions may suffer from performance processing inefficiencies, so-called performance gaps, which occur when certain types of SQL query statements are run against the relational database. By way of illustration, we describe an example performance gap that can arise in columns protected with FGACs.

A table, Table1, with columns, col1, col2, col3, col4 and col5, includes a composite FGAC rule for columns col1 and col2. A SQL query statement for table, Table1, includes the following code:
SELECT *
FROM Table1
WHERE col2>15
AND col3=125

This query retrieves rows from table, Table1, where the values of column, col2, are greater than 15 and the values of column, col3, are 125. In this case, no predicate or values for column, col1, are provided in the SQL query statement while column, col2, is constrained to values greater than 15. Since no predicate or values for column, col1, are provided in the SQL query, all of the data in the dataset or table needs to be scanned to identify values of 15 within column, col2, in a way that it needs to respect whatever condition is imposed to the composite rule that columns, col1 and col2, protected with FGACs may have. Columns, col1 and col2, provide security performance gaps in the dataset or table, where column, col1, is seen as providing an unconstrained performance gap (e.g., all the records will need to be searched in the dataset or table, since no predicate range is provided in the SQL query) and column, col2, is seen as providing a constrained performance gap (e.g., several records will need to be searched in the dataset or table, but the range is somewhat constrained by the predicate >15 in the SQL query).

This performance gap may be partially mitigated by manually introducing indexes to enhance retrieval of data. An index produces a dataset including, and ordered by, designated columns of a database table in order to enable rapid retrieval of data and avoid scanning substantial portions, or the entirety, of a database table.

For example, table, Table1, may include a composite index for columns, col1, col2, and col3, of table, Table1. The index provides a dataset with rows sorted by the values of columns, col1, col2, and col3, in this specific order.

As a further example, a query for table, Table1, may include the following:
SELECT *
FROM Table1
WHERE col1 BETWEEN 2 AND 30
AND col3=15

This query retrieves rows from table, Table1, where the values of column, col1, are between 2 and 20, and the values of column, col3, are 15. A query optimizer of the database system can generate an index scan (e.g., scan of the dataset corresponding to the index) with a start key (for column col1) of 2 and a stop key (for column col1) of 30 to apply the first predicate (col1 BETWEEN 2 AND 30) on column, col1. In order to satisfy the query results, the composite FGAC rule for columns, col1 and col2, needs to be applied to the matching keys returned by the index for column col1. Since column, col2, is part of the composite index, the imposed FGAC rule can be applied as an index predicate, but cannot be added to the start/stop keys for column, col1, since the b-tree index technology employed by a typical relational database system does not allow a range to be specified for a leading column (e.g., column, col1). Even with this improvement, column, col1, still causes a security constrained performance gap.

SUMMARY

Embodiments of the present invention disclose a method, computer system, and a computer program product for implementing fine-grained access control (FGAC) to a dataset, such as in a relational database. The present invention may include receiving a dataset query statement from a user. The present invention may then include identifying any representational index exclusions that are relevant to the query statement, each index exclusion specifying an access restriction to data in the dataset. The present invention may then include determining whether any of the identified representational index exclusions are to be applied to the query statement. The present invention may also include amending the query statement by incorporating the representational index exclusions that have been determined to be applicable so as to generate a modified query statement. The present invention may then include applying the modified query statement to the dataset in order to access the data under restriction of the representational index exclusions. The present invention may lastly include generating a query result for the user.

The dataset may be in the form of tables, a table comprising cells, and rows and columns of cells.

In certain embodiments, the query statement is a database query statement programmed in SQL. When the dataset is in the form of tables, each index exclusion may be at the level of: row, column or cell, or any combination thereof. In some database implementations, after receiving the query statement, the query statement is parsed with a parser. In certain embodiments, amending the query statement comprises creating a dynamic pseudo-view object representation of the index exclusion for the dataset and injecting the pseudo-view into the query statement. The index exclusions may conveniently be stored in a metadata privacy catalog.

The dataset may comprise a metadata privacy catalog. Moreover, the computer system may be configured to store the index exclusions in the metadata privacy catalog.

In the following we describe in more detail a method, system and computer program for implementing fine-grained access control (FGAC) of data stored in a dataset as summarized above. In response to receiving a query statement from a user, any representational index exclusions that are relevant to the query statement are identified, wherein each index exclusion specifies an access restriction to data in the dataset. It is then determined whether any of the identified relevant index exclusions are to be applied to the query statement, and if 'yes' then the query statement is modified before being processed, so that processing of the query takes place so that the dataset is searched under restriction of the index exclusions. The proposed approach allows for easy creation and modification of FGAC privacy rules without introducing performance gaps in processing the query statements.

According to another aspect of the disclosure, there is provided a computer program stored on a computer readable medium and loadable into the internal memory of a computing device, comprising software code portions, when said program is run on a computing device, for performing the above-defined method. A computer program product may also be provided which stores the above-mentioned computer program.

The dataset may be in the form of a relational database so that the query statement is a database query statement, e.g. written in SQL. However, the dataset may be other tabular forms such as hypertext markup language (HTML), or in files such as spreadsheets, such as .xls files. Moreover the dataset may not be in tabular form, for example the dataset may be a library of documents, i.e. document format files, such as .doc, .docx and .pdf files.

BRIEF DESCRIPTION OF THE SEVERAL VIEWS OF THE DRAWINGS

In the following, the present invention will further be described by way of example only with reference to exemplary embodiments illustrated in the figures.

FIG. 2 shows the syntax of index exclusion commands used in embodiments of the disclosure.

FIG. 3 is an example non-inverted data structure for a table.

FIG. 4 shows, by way of example, an inverted-index data structure representation of the same table as FIG. 3.

FIG. 5 is an example index exclusion command relating to a SQL query from user ALICE, where the syntax of FIG. 2 is followed.

FIG. 6 is an example internal index representation for user ALICE.

FIG. 7 shows, in accordance with one embodiment of the present invention, how ALICE's improper request for data that she is in part not permitted to access is dealt with.

FIG. 8 shows in the example the dataset that is returned to ALICE in response to the example SQL query, in accordance with one embodiment of the present invention.

DETAILED DESCRIPTION

In the following detailed description, for purposes of explanation and not limitation, specific details are set forth in order to provide a better understanding of the present disclosure. It will be apparent to one skilled in the art that the present disclosure may be practiced in other embodiments that depart from these specific details.

In the following detailed description we refer mainly to implementations which are SQL queries made to a relational database, where SQL stands for Structured Query Language. However, it will be understood that the embodiments described are equally well applicable to queries written in other languages that are capable of interrogating relational databases.

Figure 1:
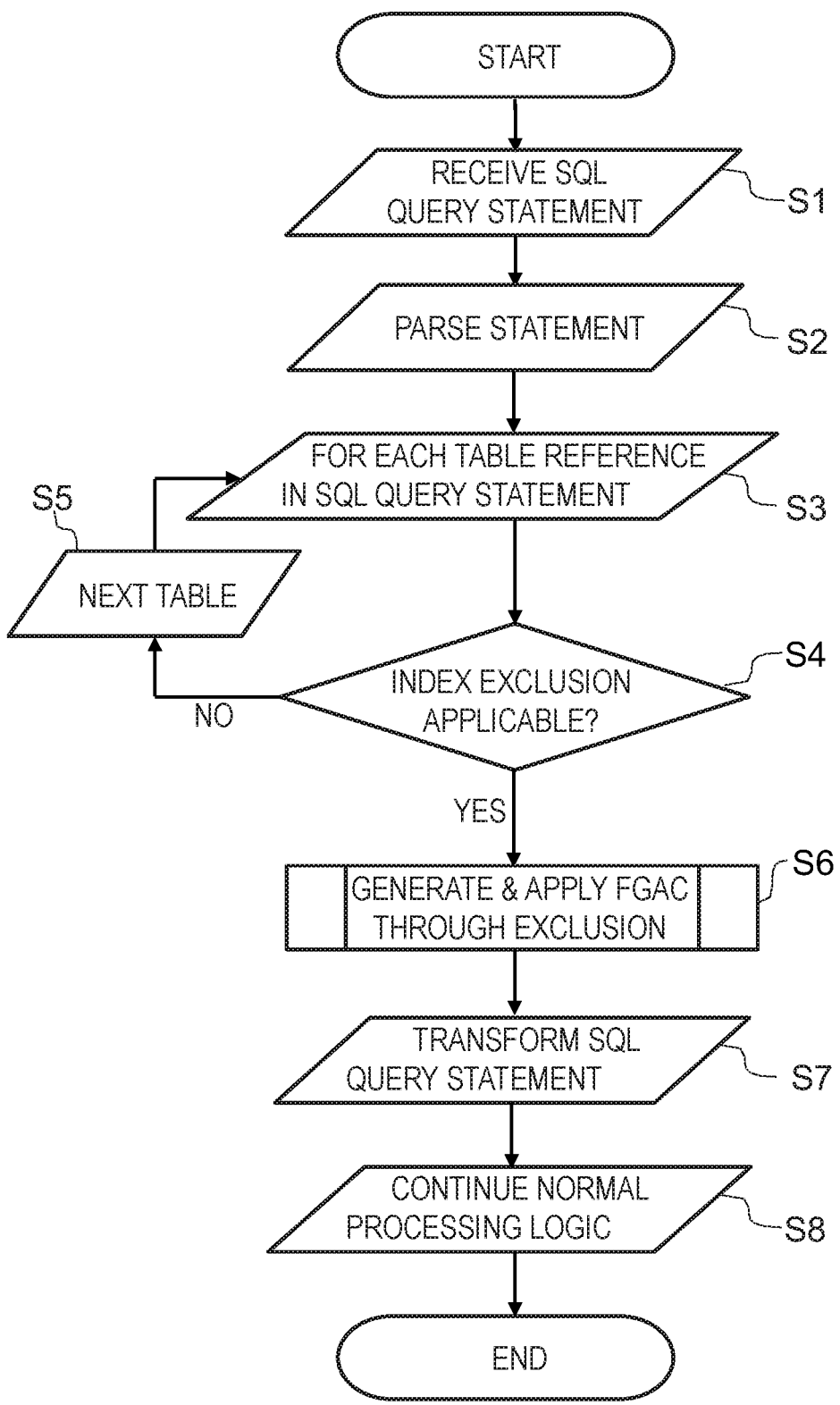
FIG. 1 is a flow diagram showing the handling of a SQL query statement according to an embodiment of the disclosure.

FIG. 1 is a flow diagram showing the handling of a SQL query statement according to an embodiment of the disclosure to implement fine-grained access control (FGAC) to data in a table of a relational database using representational index exclusion. A table is a two-dimensional array organized into rows and columns, with the individual elements of the table also being referred to as cells or intersections, the latter since an element can be uniquely referred to by its row and column address, i.e. where a particular row and a particular column intersect.

In Step S1, the user of the database system requests access to a table through a SQL query statement. The database compiler receives the SQL statement.

In Step S2, a parser splits the SQL query statement into several components for compilation and then transforms each component into a compiler-compatible format.

In Steps S3 and S4, for each reference to a table in the SQL query statement, an exclusion function validates, i.e. determines, if any index exclusion to data in the table has been configured in respect of retrieving the data from the database metadata stored in privacy catalogs. Index exclusion is defined in the database for an object such as a table. A convenient location for storing index exclusions is in the database metadata privacy catalog. If an index exclusion is configured, the exclusion function evaluates whether the index exclusion references any tables from the SQL query statement.

If Step S4 determines the validation matches any data associated with the index exclusion within the SQL query statement, i.e. Step S4 returns a 'yes', then process flow proceeds to Step S6 where the index exclusion is applied to the SQL query statement. Also in Step S6, after all validations for the table have been processed, the exclusion function then creates a dynamic pseudo-view object representation of the index exclusion for the table.

On the other hand, if Step S4 returns a 'no' then process flow proceeds to Step S5 where the next table is loaded and then the newly loaded table is processed in Step S3.

In Step S7, if the validation matches any data associated with the index exclusion within the SQL query statement, the FGAC index exclusion is then applied to the user's SQL query statement to transform it into a modified SQL query statement. After all tables have been evaluated for index exclusion, and the resultant pseudo-views have been created, the pseudo-view constructs are injected into the SQL query statement representation.

The transition from Step S7 to S8 represents the modified SQL query statement being passed on to a SQL compiler for processing according to the compiler's processing logic. Here we note that the SQL compiler can be conventional and needs no modification to take account of the preceding pre-processing steps. In other words, the usual query rewrite and/or optimization operations performed by the SQL compiler are not affected by the index exclusions.

Finally the process flow ends with the result of the query being transmitted to the user.

In summary of the embodiment, the process flow commences with receiving and then parsing a user's SQL query statement; and then proceeds by identifying any representational index exclusion relevant to the SQL query statement, the index exclusion specifying access to data in a table in the database at the level of a row, column and/or cell; determining whether any identified applicable index exclusions are to be applied to the SQL query statement; transforming the SQL query statement into a modified SQL query statement which implements fine-grained access control through index exclusion; and permitting the SQL query to access the tables selectively based on the identified compiled index exclusion definition. The process flow completes with the query result being returned to the requesting user.

FIG. 2 gives the syntax that is used for index exclusion commands. The syntax specifies that those users in "recipient-authorization-name" are allowed access to table "table-name" on columns "columns-name" conditional on "exclusion-condition":

"exclusion-index-name" is the name of the exclusion index that is being created, and is unique in the sense that it cannot be the same as for another exclusion index.

"table-name" is the name of the table where the exclusion index has its domain.

"columns-name" is the name of the columns where the exclusion index has its domain.

"ALL" signifies that the exclusion index applies to all columns in the table.

"exclusion-condition" is the result of a search condition where the index exclusion has its domain, i.e. is an exclusion for a particular column, row or cell.

"recipient-exception-authorization-name" is the name of the recipient that has excluded access to table "table-name" on columns "columns-name" with "exclusion-condition".

"recipient-authorization-name" is the name of the recipient that has authorization access to table "table-name" on columns "columns-name" conditional on "exclusion-condition".

Once an index exclusion definition is configured for a table, any SQL query statement that attempts to access that table will have the index exclusion definition imposed, i.e. applied, to that access. An index exclusion may be implemented as a b-tree based inverted index. An inverted index is a data structure storing a mapping from content to its locations.

FIG. 3 is an example non-inverted data structure for the table INSURANCE.CONTRACTS and FIG. 4 shows a corresponding inverted-index data structure for the table of FIG. 3. This means that the data record 'BOB' can be found positionally in rows 1, 2, 3 and 4 of the table and the data record 'SALES' can be found positionally in rows 2, 3 and 6 of the table.

An index exclusion command is a single command comprising a combination of index exclusions and user authorizations. An index exclusion can be specified at the level of a column, a row, or a cell. More than one index exclusion can be specified for a table for the same user. If multiple index exclusions have been defined for a table for the same user, then we consider two design choices for combining the multiple exclusions: a) intersection, and b) union. In the case of intersection, since every Boolean condition can be reduced to conjunctive normal form (CNF), intersection is defined as "ANDing" of various "where" conditions of individual row exclusions, while union is defined as "ORing" of various "where" conditions of individual row exclusions. A general representation of an exclusion can be defined for example as: ((condition1 AND condition2) OR (condition3) AND (condition4 AND condition5 OR condition6)).

We now present a simple example to show the principles of the proposed approach. Let us consider the EXCLUSION INDEX definition shown in FIG. 5 created for the table INSURANCE.CONTRACTS shown in FIG. 3. In this example, this statement would create an exclusion on the table INSURANCE.CONTRACTS, where the condition "IS_ACTIVE='Y' AND DATES='01/2020' AND DATES='01/2019'" is verified. As such, in this case the database user ALICE needs to verify this condition when she tries to access information from this table. However the user BOB does not need to verify this condition when he tries to access information from this table. This will create an internal index representation for user ALICE as shown in FIG. 6. So when user ALICE attempts to access all the information on table INSURANCE.CONTRACTS she will trigger what is shown in FIG. 7. Conceptually, for ease of understanding, this can be translated into pseudo SQL language as such:

(SELECT ALL COLUMNS FROM TABLE INSURANCE.CONTRACTS) EXCEPT (SELECT ALL COLUMNS FROM TABLE INSURANCE.CONTRACTS WHERE IS_ACTIVE='Y' AND DATES='01/2020' AND DATES='01/2019')

Consequently, the result returned to ALICE will be the dataset represented in FIG. 8.

On the other hand, if user BOB attempts to access the information on table INSURANCE.CONTRACTS, he will be able to see the all content of the table data, since he does not have the exclusion definition imposed on him.

The proposed approach thus provides a declarative process for easy creation and modification of FGAC privacy rules in a database system. An advantage of the proposed approach is that it permits the application of FGAC control schemes without introducing performance gaps in processing the SQL query statements.

Having described the principles of an embodiment as well as an example, we now describe the underlying hardware, software and network components of a system for implementing the above methods.

Figure 9:
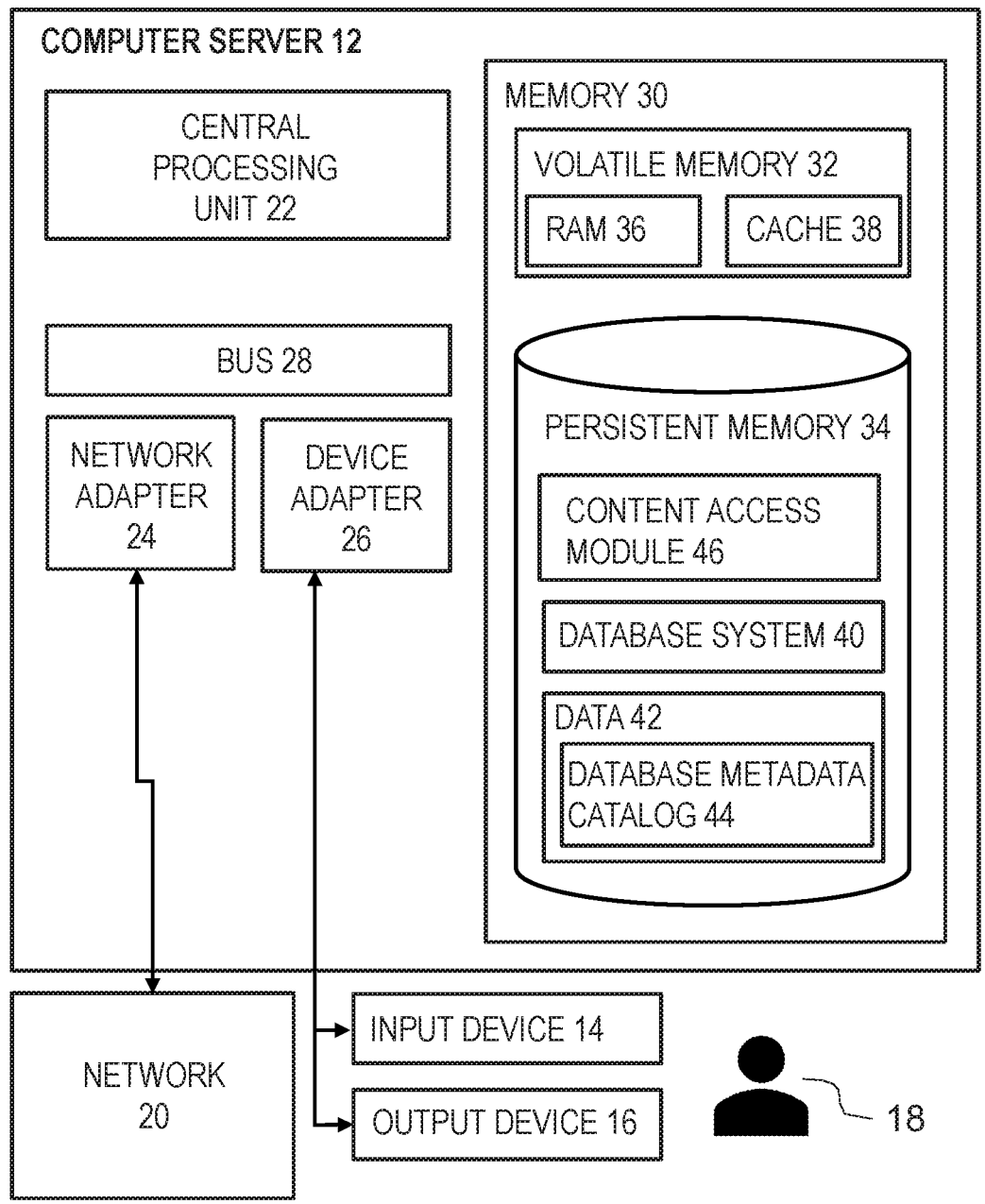
FIG. 9 is a block diagram showing internal features of a database server according to embodiments of the disclosure.

FIG. 9 is a block diagram showing internal features of a RDBMS server 12 that supports FGAC according to embodiments of the disclosure. Examples of computer processing systems, environments, and configurations that may be suitable for the server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices.

The server 12 may be described in the general context of computer readable instructions, such as program modules, being executed by a computer processor. Generally, program modules may include routines, programs, objects, components, logic, and data structures that perform particular tasks or implement particular abstract data types. The server 12 may be embodied in distributed cloud computing environments where tasks are performed by remote processing devices that are linked through a communications network. In a distributed cloud computing environment, program modules may be located in both local and remote computer system storage media, including memory storage devices.

The server 12 is in communicative connection with a network 20 as well as input and output devices 14, 16. The server 12 communicates with a user 18 using the input and output devices 14, 16. Input devices 14 may include one or more of a keyboard, a scanner, a mouse, a trackball, or other pointing devices. Output devices 16 may include one or more of a display and a printer. The server 12 may communicate with other devices (not shown in FIG. 9) via the network 20. Network 20 can be a local area network (LAN), a wide area network (WAN), or the Internet, for example. The server 12 includes a central processing unit (CPU) 22, a network adapter 24, a device adapter 26, a bus 28 and a memory 30.

The CPU 22 is operable to load machine readable instructions from the memory 30 and to perform machine operations according to the instructions. Such machine operations include, for example, incrementing or decrementing a value in a register, transferring a value from memory 30 to a register or vice versa, branching to a different location in memory if a condition is true or false (also known as a conditional branch instruction), and adding or subtracting the values in two different registers and loading the result in another register. A typical CPU can perform many different machine operations. A set of machine instructions is called a machine code program, the machine instructions are written in a machine code language, which is referred to a low level language. A computer program written in a high level language needs to be compiled to a machine code program before it can be run. Alternatively a machine code program such as a virtual machine or an interpreter can interpret a high level language in terms of machine operations. The network adapter 24 is connected to the server bus 28 and the network 20 for enabling communication between the server 12 and network devices. The device adapter 26 is connected to the bus 28, and the input and output devices 14, 16 for enabling communication between the server 12, the input devices 14, and the output devices 16. The bus 28 couples the main system components together, including the memory 30, to the CPU 22. The bus 28 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The memory 30 includes computer system readable media in the form of volatile memory 32 and non-volatile or persistent memory 34. Examples of volatile memory 32 are random access memory (RAM) 36 and cache memory 38. Generally, volatile memory is used because it is faster, and generally, non-volatile memory is used because it will hold the data for longer. Computer processing system 10 may further include other removable or non-removable, volatile or non-volatile computer system storage media. By way of example only, persistent memory 34 can be provided for reading from and writing to a non-removable, non-volatile magnetic media (not shown and typically a magnetic hard disk or solid-state drive). Although not shown, further storage media may be provided, including an external port for removable, non-volatile solid-state memory; and an optical disk drive for reading from or writing to a removable, non-volatile optical disk such as a compact disk (CD), digital video disk (DVD), or Blu-ray. In such instances, each can be connected to bus 28 by one or more data media interfaces. As will be further depicted and described below, memory 30 may include at least one program product having a set (i.e., at least one) of program modules that are configured to carry out the functions of embodiments of this disclosure.

The FGAC system installed on the server 12 may include a set of the program modules configured to carry out the functions of this disclosure, including content access module 46, database system 40, data 42, and a database metadata catalog 44. Further program modules that may be provided to support the FGAC system, but which are not shown, include firmware, a bootstrap program, an operating system, and support applications. Each of the operating system, support applications, other program modules, and program data, or some combination thereof, may include an implementation of a networking environment. The server 12 is arranged in operative communication with at least one network 20 (e.g., a local area network (LAN), a general wide area network (WAN), or a public network like the Internet) via the network adapter 24. The network adapter 24 communicates with the other components of the server 12 via the bus 28. It should be understood that, although not shown, other hardware or software components could be used in conjunction with server 12. Examples include, but are not limited to, microcode, device drivers, redundant processing units, external disk drive arrays, redundant array of independent disks (RAID), tape drives, and data archival storage systems.

Figure 10:
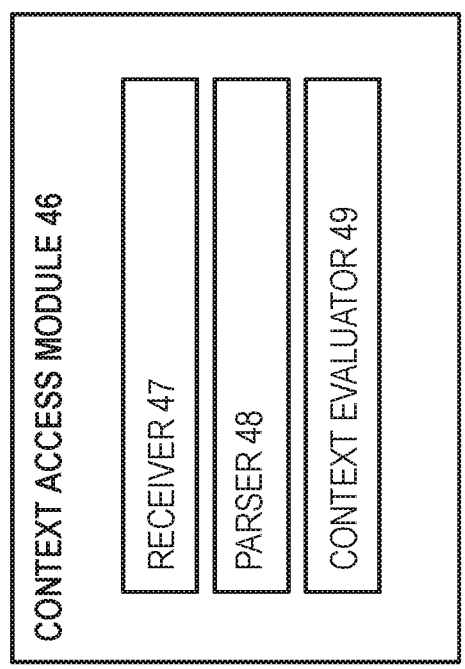
FIG. 10 shows, in accordance with one embodiment of the present invention, further features of the context access module.

FIG. 10 shows further features of the context access module 46. The FGAC system uses the context access module 46 to implement FGAC to data in a table of a RDBMS. The context may be in relation to a user or a role performed by the user. Context access module 46 includes a receiver 47, a parser 48, a context evaluator 49, and a context access method. The receiver 47 is for receiving a user SQL query after a user requests access to a table using a SQL query. The parser 48 is for splitting the query into several components preceding compilation and for transforming the components according to compiler definitions to generate a modified SQL query that is optimized according to the specific measures described elsewhere in this document. The context evaluator 49 is for validating if any FGAC has been configured for any table references. If FGAC is configured, then the context evaluator 49 evaluates whether the context references any tables from the current SQL query. This evaluation is based on a validation of defined table-based attributes with the purpose of the context. The FGAC request is applied to the SQL query if the validation matches the attributes with the purpose of the context. After all validations for the table have been processed, the context evaluator 49 creates a pseudo-view object using the table columns configured in the context. After all tables have been evaluated for FGAC permissions and the resultant pseudo-view is created, the context evaluator 49 enforces the result in place of the original SQL query representation generated by the user. Finally, the result is presented to the user.

Figure 11:
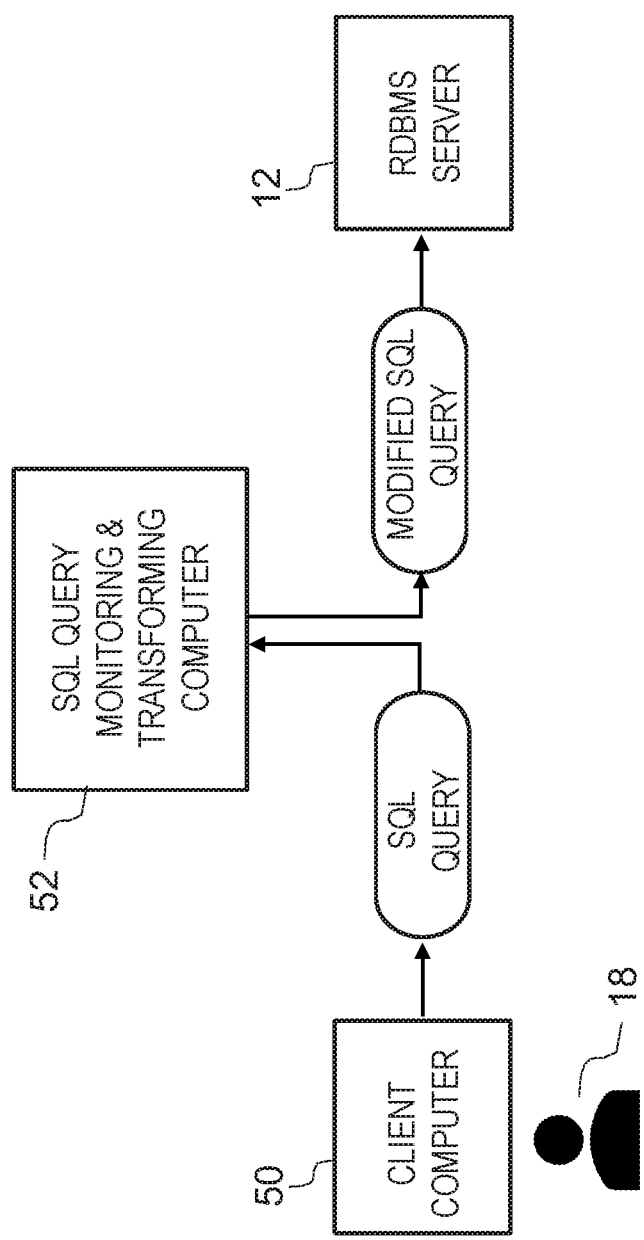
FIG. 11 shows the system actors and process flow involved in submitting a SQL query according to embodiments of the disclosure.

FIG. 11 shows the system actors and process flow involved in submitting a SQL query according to embodiments of the disclosure. A client computer 50 under control of a user 18 submits a SQL query to the RDBMS server 12. The user 18 could be a person or a machine (e.g. a 'bot'). Instead of the SQL query being submitted directly to the RDBMS server 12, it is screened by a further computer 52 whose role it is to monitor the SQL requests and if necessary modify them according to the applicable FGAC rules before they are submitted to the RDBMS for processing. Although the SQL screening function is illustrated as being performed by a separate computer, it will be understood that this function may instead be subsumed into the RDBMS server 12 as an input stage thereof. Alternatively, the function could be subsumed in the client computer as an output stage thereof, e.g. by the RDBMS server 12 causing a suitable API or other software component to be installed on the client computer 50 as part of a set-up procedure to permit the client computer 50 to submit SQL queries.

We now mention an alternative implementation of a document holding tables. The following table is a summary of the information held in a set of Microsoft Word documents (.doc or .docx).

TABLE 1

Alternative Document Holding Table

| DocID | Words |
|---|---|
| 1 | Hello to all |
| 2 | Hello World |
| 3 | Love to all |
| 4 | Love World |

The keyword 'hello' appears in two of the four documents, namely documents 1 and 2. Hence, an inverted index can be created for such keywords which maps the keywords to the list of documents as shown in the following table.

TABLE 2

Inverted Index Map

| Word | DocIDs |
|---|---|
| Hello | 1, 2 |
| World | 2, 4 |
| Love | 3, 4 |
| all | 1, 3 |

It can therefore be appreciated how the teaching of the disclosure can be applied outside the field of relational databases to any dataset.

Figure 12A:
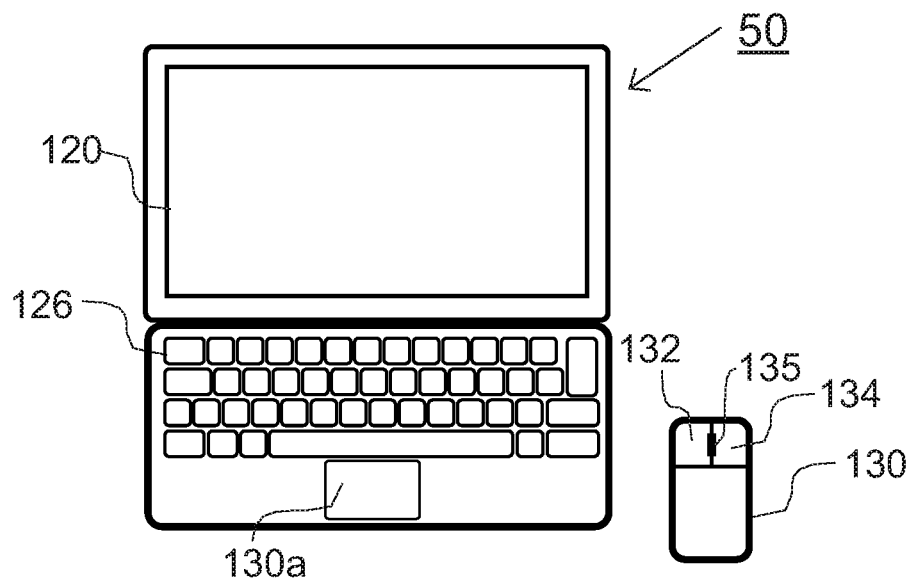
FIG. 12A is a schematic view of an example client computer.
Figure 12B:
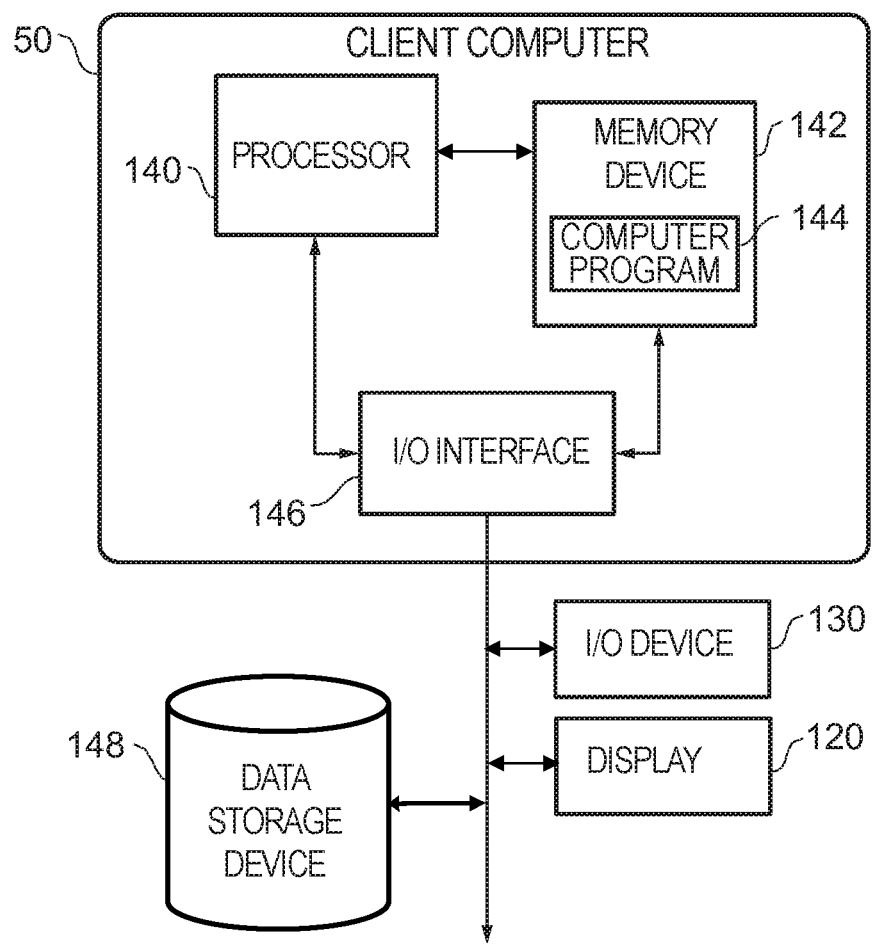
FIG. 12B is a block diagram showing, in accordance with one embodiment of the present invention, internal structure of the client computer and related components.

FIG. 12A is a schematic view of an example client computer and FIG. 12B is a block diagram showing internal structure of the client computer and related components operatively connected to the client computer. FIG. 12A shows a client computer 50 in a laptop format with an inbuilt monitor 120 housing a display screen. The client computer 50 has an operating system which incorporates support for a graphical user interface (GUI) that includes display of a cursor on the display screen or screens that are available. The cursor's position and motion is controllable by a user-driven I/O device, which we generically refer to as a pointing device. The client computer 50 is also connected to a pointing device in the form of a mouse 130 including a left button 132, a right button 134 and a scroll wheel 135. Of course further buttons and input elements may also be included, such as in a mouse designed or configured for gaming or other specific application types. The computer 50 also has an inbuilt pointing device in the form of a trackpad 130a. The computer 50 further comprises an inbuilt keyboard 126. The keyboard 126, mouse 130 and trackpad 130a are examples of I/O devices. By I/O device we mean a device that is communicatively connected to control elements of the computer, such as its central processing unit (CPU) or graphics processing unit (GPU). In the case that the laptop display includes an overlaid touch sensor, then the touch sensor will constitute a further I/O device, which can also function as a pointing device. The keyboard 126 includes a plurality of keys, e.g. following a standard QWERTY layout and space bar, with other standard keys such as ENTER, CAPS LOCK, ALT, CTRL, FN and so forth also being provided. FIG. 12B shows internal structure of the client computer 50 of FIG. 12A in a block diagram. The client computer 50 comprises a processor 140, e.g. a central processing unit (CPU), to provide a processor resource coupled through one or more I/O interfaces 146 to one or more hardware data storage devices 148 and one or more I/O devices 130, some of which are configured to manage graphic object requests, e.g. relating to cursor control, and one or more displays 120. The processor 140 may also be connected to one or more memory devices 142. At least one memory device 142 to provide a memory resource contains a stored computer program 144, which is a computer program that comprises computer-readable and executable instructions. The data storage devices 148 may store the computer program 144. The computer program 144 stored in the storage devices 148 is configured to be executed by processor 140 via the memory devices 142. The processor 140 is operable to execute the stored computer program 144.

It will be clear to one of ordinary skill in the art that all or part of the logical process steps of the preferred embodiment may be alternatively embodied in a logic apparatus, or a plurality of logic apparatus, comprising logic elements arranged to perform the logical process steps of the method and that such logic elements may comprise hardware components, firmware components or a combination thereof.

It will be equally clear to one of skill in the art that all or part of the logic components of the preferred embodiment may be alternatively embodied in logic apparatus comprising logic elements to perform the steps of the method, and that such logic elements may comprise components such as logic gates in, for example, a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, the present invention may be realized in the form of a computer implemented method of deploying a service comprising steps of deploying computer program operable to, when deployed into a computer infrastructure and executed thereon, cause the computing device to perform all the steps of the method.

It will be appreciated that the method and components of the preferred embodiment may alternatively be embodied fully or partially in a parallel computing system comprising two or more processors for executing parallel software.

A further embodiment of the invention is a computer program product defined in terms of a system and method. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 13:
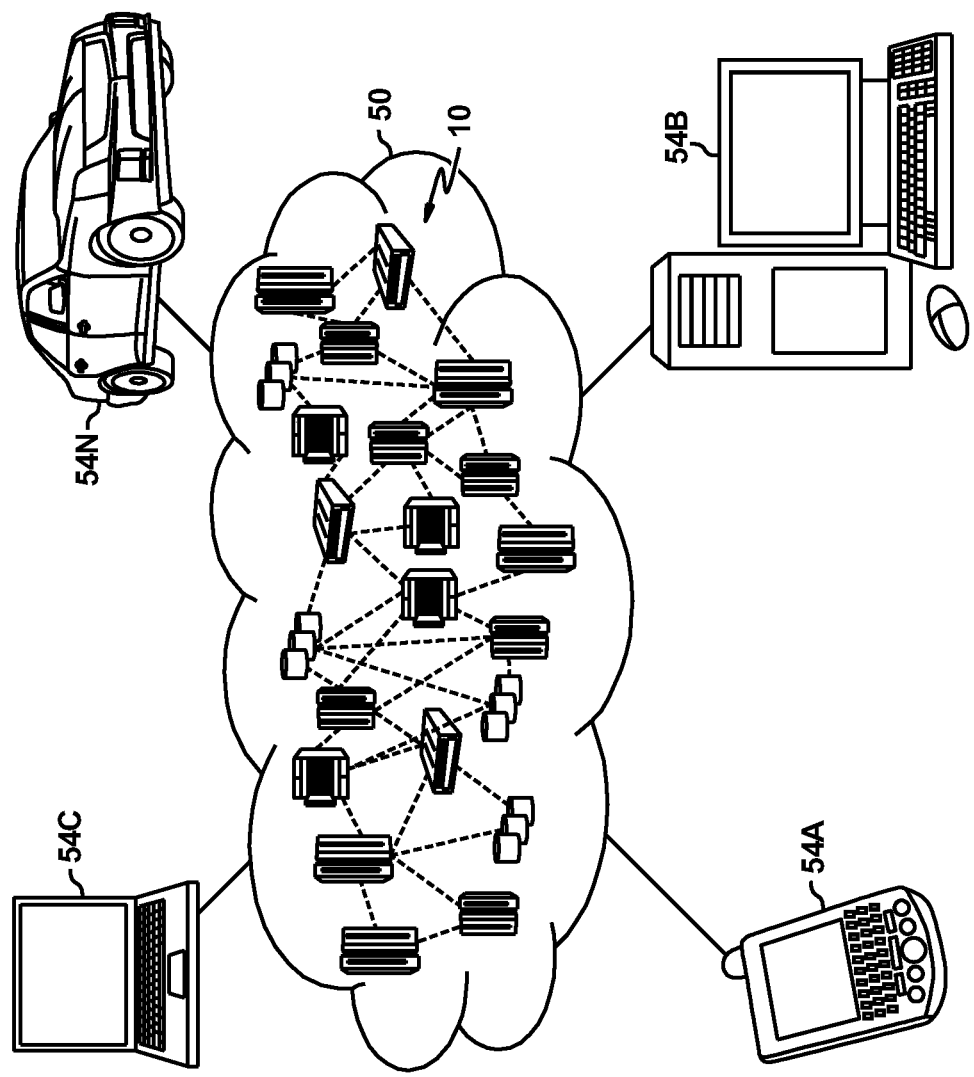
FIG. 13 depicts a cloud computing environment according to an embodiment of the present disclosure.

Referring now to FIG. 13, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 14:
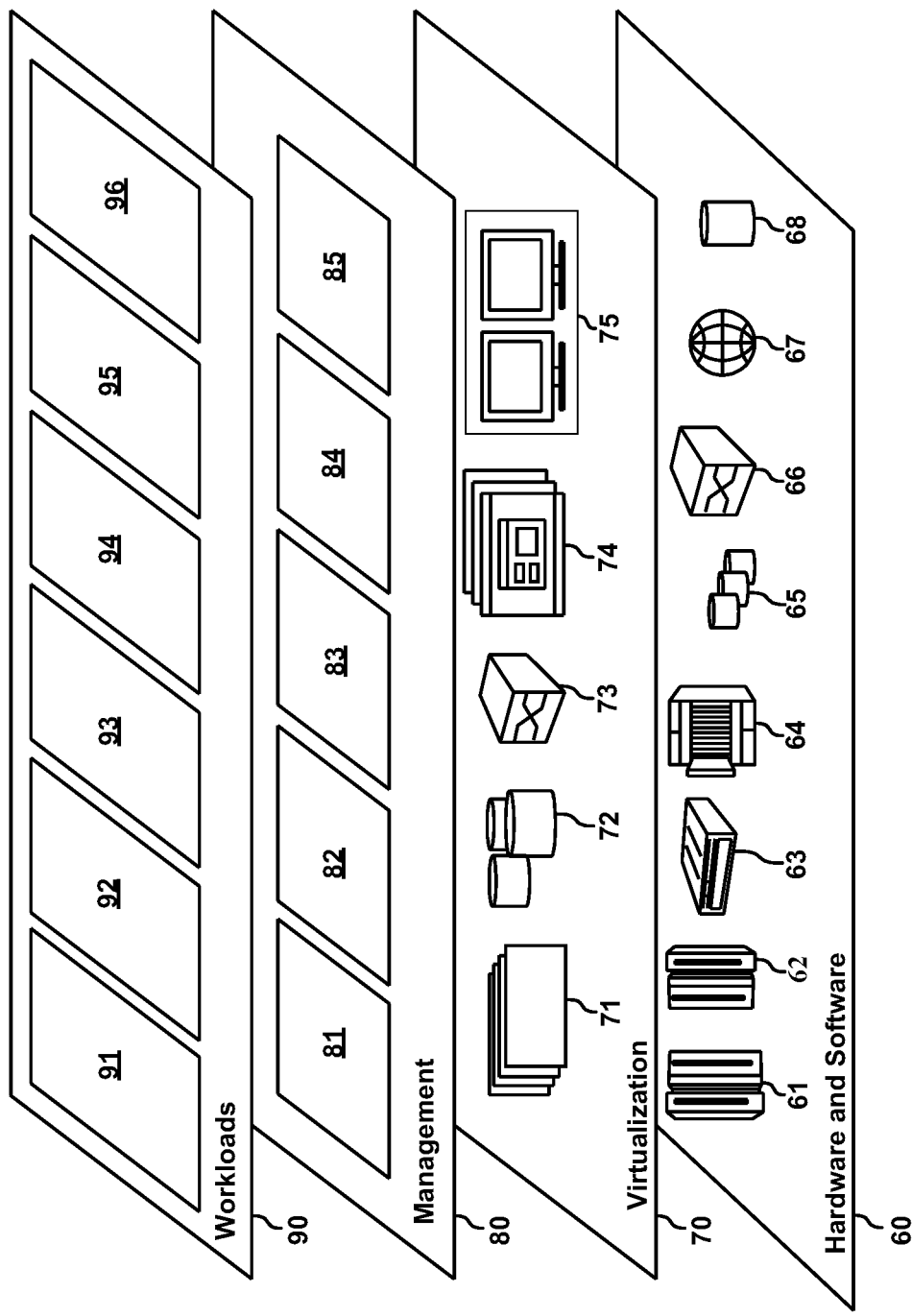
FIG. 14 depicts abstraction model layers according to an embodiment of the present disclosure.

Referring now to FIG. 14, a set of functional abstraction layers provided by cloud computing environment 50 (FIG. 13) is shown. It should be understood in advance that the components, layers, and functions shown in FIG. 14 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software lifecycle management 92; virtual classroom education delivery 93; data analytics processing 94; transaction processing 95; and fine-grained access control to a database 96 according to embodiments of the disclosure.

In summary, in the above detailed description we have described a computer-automated method, computer system and computer program for implementing fine-grained access control of data stored in a dataset. An example dataset is a database in which the data is held in tabular form. Another example dataset is a set of documents. In the case of a database, the query statement is a database query statement, e.g. written in SQL. With reference to the query statement, any representational index exclusions that are relevant to the query statement are identified, wherein each index exclusion specifies an access restriction to data in the dataset, e.g. an access restriction to the tables or documents. It is then determined whether any of the identified relevant index exclusions are to be applied to the query statement, and if 'yes' then the query statement is modified before being processed, so that processing of the query takes place by searching the dataset, e.g. tables or documents, under restriction of the index exclusions. The proposed approach allows for easy creation and modification of FGAC privacy rules without introducing performance gaps in processing the query statements.

It will be clear to one skilled in the art that many improvements and modifications can be made to the foregoing exemplary embodiment without departing from the scope of the present disclosure.

What is claimed is:

1. A method for implementing fine-grained access control, FGAC, of data stored in a dataset, the method comprising:
    receiving a data query statement from a user, wherein the data query statement is a SQL data query statement that requests access to data in the dataset, wherein the dataset is structured as a b-tree index;
    identifying any representational index exclusions in one or more index exclusion commands that are relevant to the data query statement, each index exclusion command specifying a combination of representational index exclusions and user authorizations, including an access restriction to data in the dataset;
    determining that at least two of the identified representational index exclusions are to be applied to the data query statement;
    combining the two identified representational index exclusions by intersection;
    amending the data query statement, before the data query statement is processed, by incorporating the representational index exclusions, implemented as a b-tree based inverted index, that have been determined to be applicable so as to generate a modified data query statement which is under the restriction of the representational index exclusions;
    applying the modified data query statement to the database in order to access the data under restriction of the representational index exclusions; and
    generating a query result for the user.

2. The method of claim 1, further comprising, after receiving the data query statement, parsing the data query statement into the one or more index exclusion commands and transforming the one or more index exclusion commands according to at least one compiler definition.

3. The method of claim 1, wherein amending the data query statement comprises creating a dynamic pseudo-view object representation of the index exclusion and injecting the pseudo-view into the data query statement.

4. The method of claim 1, further comprising storing the representational index exclusions in a metadata privacy catalog of the dataset.

5. The method of claim 1, wherein the dataset holds data in tables, each table comprising cells, and rows and columns of cells.

6. The method of claim 5, wherein each index exclusion is at the level of at least one of: row, column and cell.

7. The method of claim 6, wherein the dataset is held in a relational database and the data query statement is a database data query statement.

8. The method of claim 1, wherein the dataset is held in a plurality of documents.

9. A computer program product for implementing fine-grained access control, FGAC, of data stored in a dataset, comprising:
    receiving a data query statement from a user, wherein the data query statement is a SQL data query statement that requests access to data in the dataset, wherein the dataset is structured as a b-tree index;
    identifying any representational index exclusions in one or more index exclusion commands that are relevant to the data query statement, each index exclusion command specifying a combination of representational index exclusions and user authorizations, including an access restriction to data in the dataset;
    determining that at least two of the identified representational index exclusions is to be applied to the data query statement;
    combining the two identified representational index exclusions by intersection;
    amending the data query statement, before the data query statement is processed, by incorporating the representational index exclusions, implemented as a b-tree based inverted index, that have been determined to be applicable so as to generate a modified data query statement which is under the restriction of the representational index exclusions;
    applying the modified data query statement to the database in order to access the data under restriction of the representational index exclusions; and
    generating a query result for the user.

10. The computer program product of claim 9, wherein amending the data query statement comprises creating a dynamic pseudo-view object representation of the index exclusion and injecting the pseudo-view into the data query statement.

11. The computer program product of claim 9, further comprising storing the representational index exclusions in a metadata privacy catalog of the dataset.

12. The computer program product of claim 9, wherein the dataset holds data in tables, each table comprising cells, and rows and columns of cells.

13. A computer system for implementing fine-grained access control, FGAC, of data stored in a dataset, comprising:
    one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
    receiving a data query statement from a user, wherein the data query statement is a SQL data query statement that requests access to data in the dataset, wherein the dataset is structured as a b-tree index;
    identifying any representational index exclusions in one or more index exclusion commands that are relevant to the data query statement, each index exclusion command specifying a combination of representational index exclusions and user authorizations, including an access restriction to data in the dataset;

determining that at least two of the identified representational index exclusions is to be applied to the data query statement;

combining the two identified representational index exclusions by intersection;

amending the data query statement, before the data query statement is processed, by incorporating the representational index exclusions, implemented as a b-tree based inverted index, that have been determined to be applicable so as to generate a modified data query statement which is under the restriction of the representational index exclusions;

applying the modified data query statement to the database in order to access the data under restriction of the representational index exclusions; and generating a query result for the user.

14. The computer system of claim 13, further comprising, after receiving the data query statement, parsing the data query statement.

15. The computer system of claim 13, wherein amending the data query statement comprises creating a dynamic pseudo-view object representation of the index exclusion and injecting the pseudo-view into the data query statement.

16. The computer system of claim 13, further comprising storing the representational index exclusions in a metadata privacy catalog of the dataset.

17. The computer system of claim 13, wherein the dataset holds data in tables, each table comprising cells, and rows and columns of cells.

18. The computer system of claim 17, wherein each index exclusion is at the level of at least one of: row, column and cell.

19. The computer system of claim 18, wherein the dataset is held in a relational database and the data query statement is a database data query statement.

20. The computer system of claim 13, wherein the dataset is held in a plurality of documents.

* * * * *